Aug. 21, 1934.     W. W. BURTON     1,971,062
COIN FREED AMUSEMENT DEVICE
Filed June 3, 1933      7 Sheets-Sheet 1
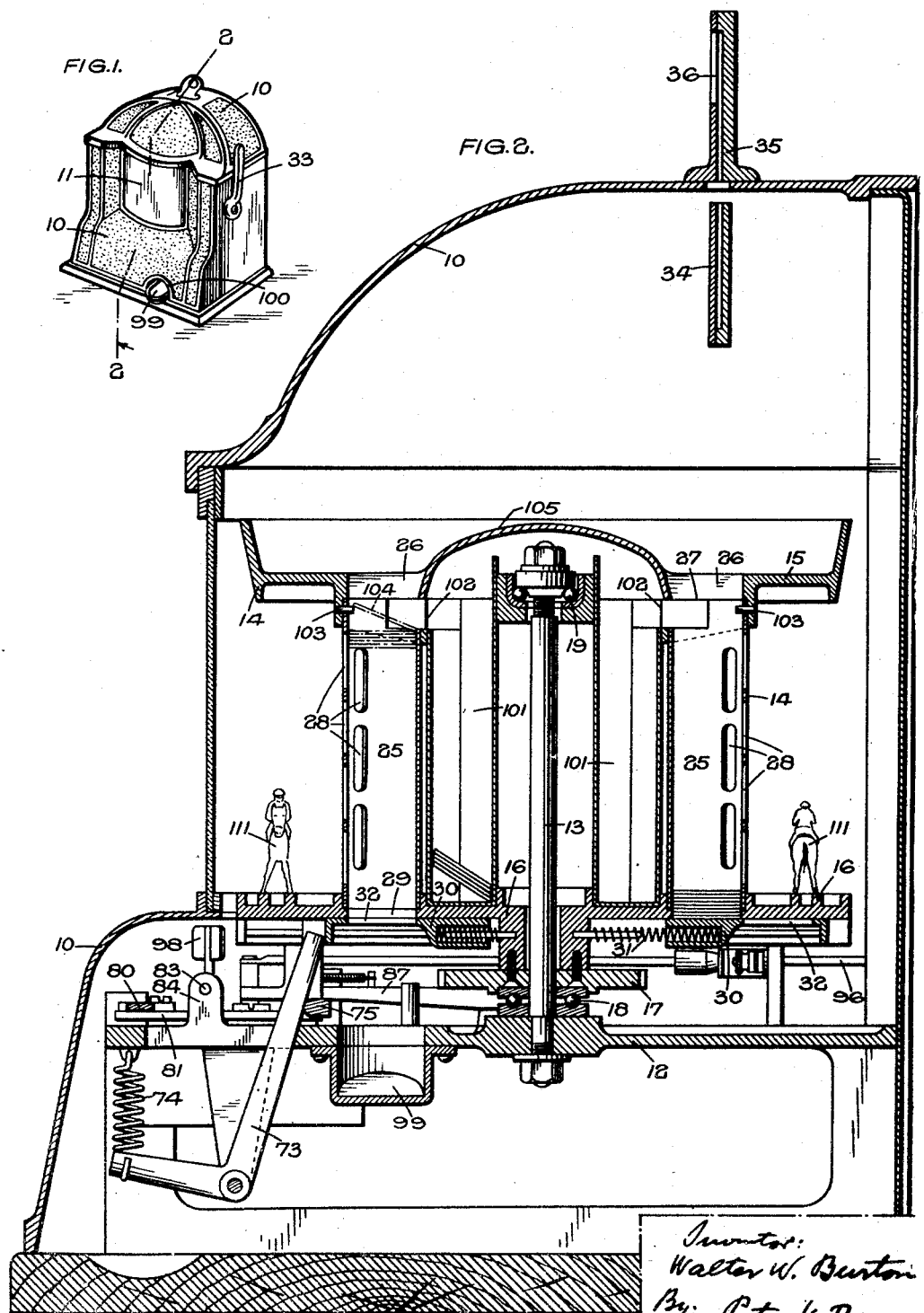

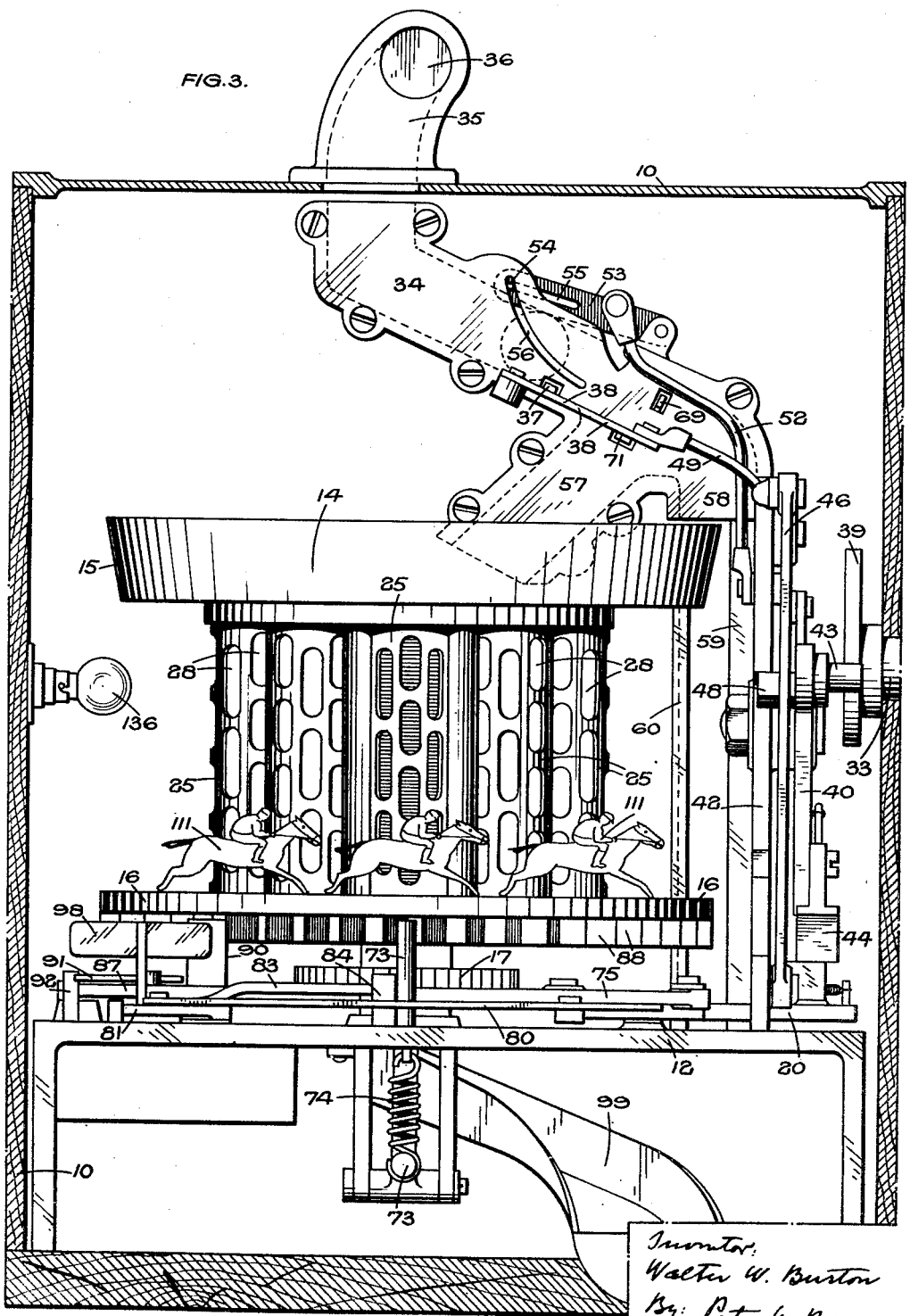

Aug. 21, 1934.  W. W. BURTON  1,971,062
COIN FREED AMUSEMENT DEVICE
Filed June 3, 1933   7 Sheets-Sheet 3

Aug. 21, 1934.  W. W. BURTON  1,971,062
COIN FREED AMUSEMENT DEVICE
Filed June 3, 1933  7 Sheets-Sheet 4

Aug. 21, 1934.  W. W. BURTON  1,971,062
COIN FREED AMUSEMENT DEVICE
Filed June 3, 1933    7 Sheets-Sheet 5
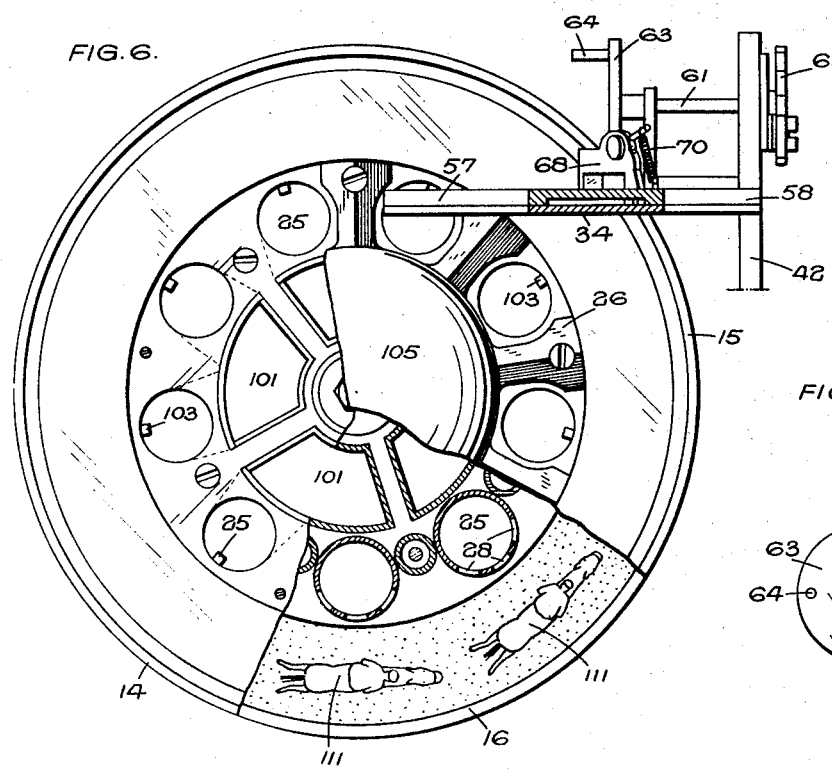
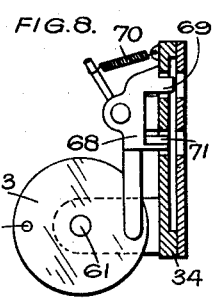
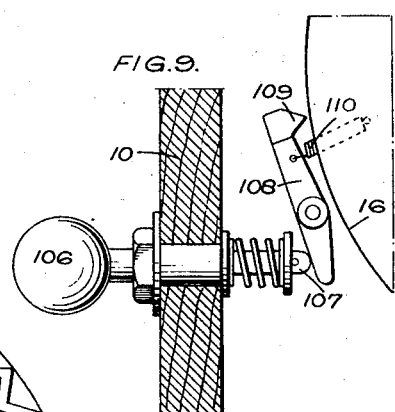
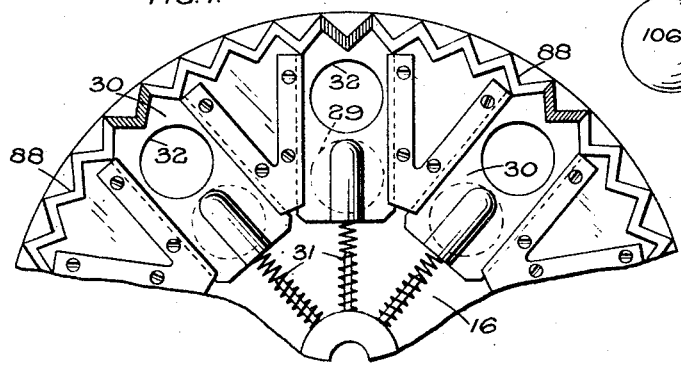

Aug. 21, 1934.  W. W. BURTON  1,971,062
COIN FREED AMUSEMENT DEVICE
Filed June 3, 1933   7 Sheets-Sheet 6
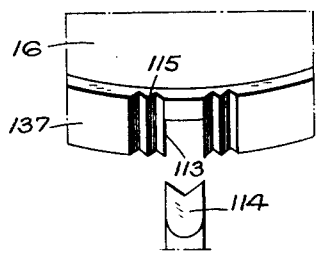
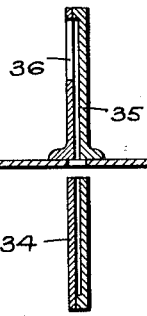
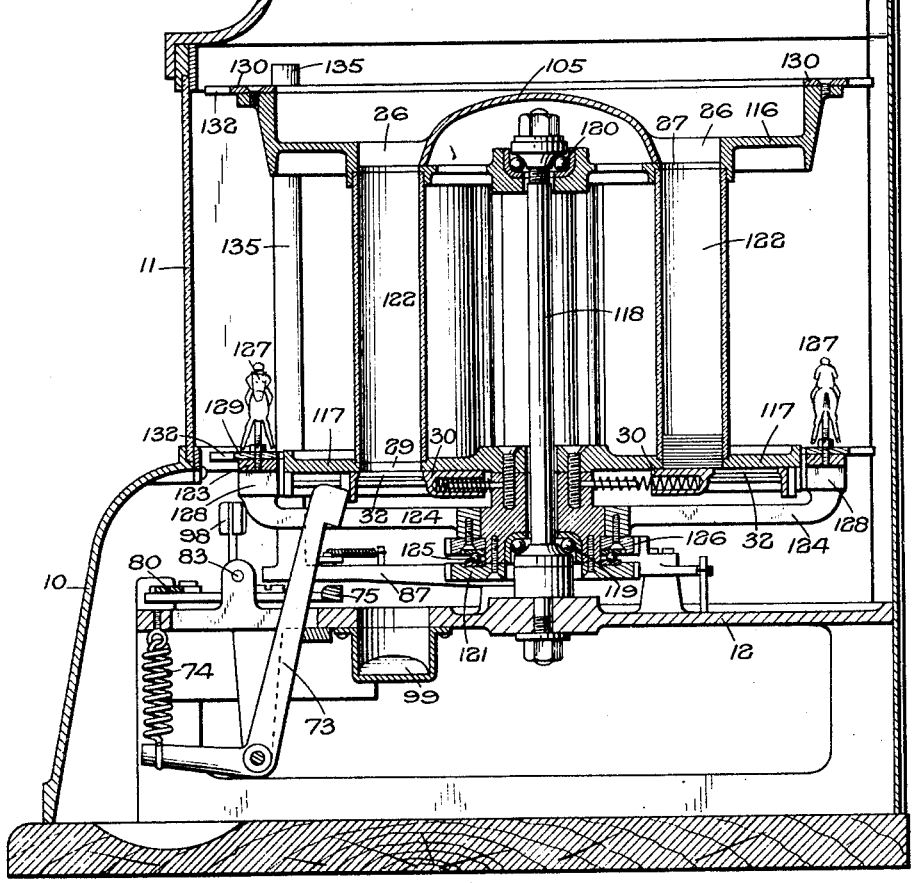

Aug. 21, 1934.  W. W. BURTON  1,971,062
COIN FREED AMUSEMENT DEVICE
Filed June 3, 1933  7 Sheets-Sheet 7
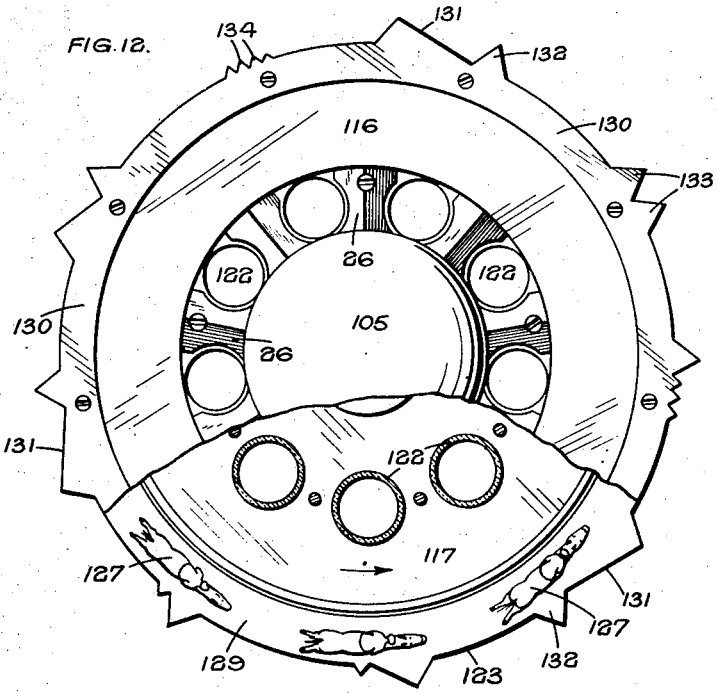
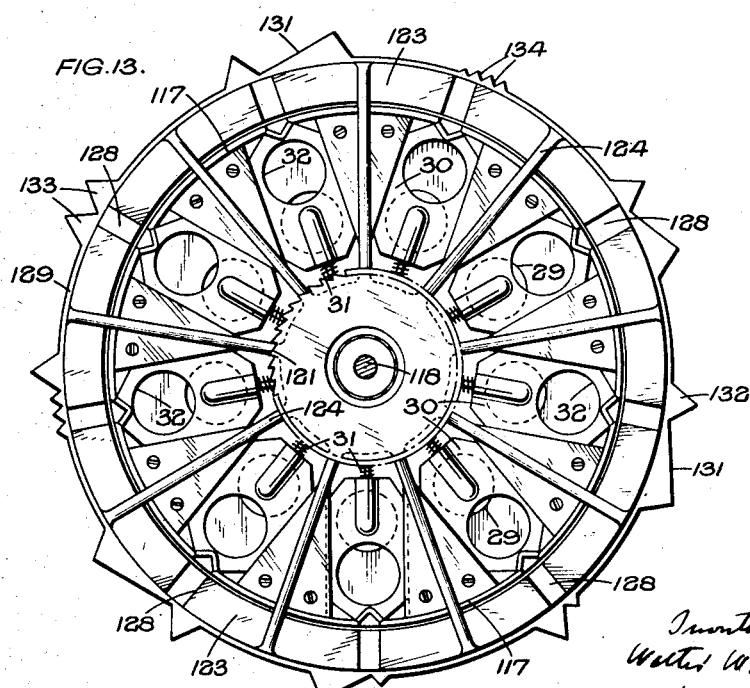

Patented Aug. 21, 1934

1,971,062

UNITED STATES PATENT OFFICE 1,971,062

COIN FREED AMUSEMENT DEVICE

Walter William Burton, Birmingham, England

Application June 3, 1933, Serial No. 674,135
In Great Britain May 4, 1932

11 Claims. (Cl. 194—2)

This invention relates to an amusement device of the kind which is adapted to be freed, for operation by an operator, by the insertion of a counter or coin into the apparatus, and in which provision is made for a percentage of the counters or coins inserted in the apparatus being delivered to a container or containers under the sole control of the proprietor of the apparatus, whilst the remaining counters or coins inserted in the apparatus are returnable to an operator under certain conditions and are passed to delivery means from which he can obtain delivery.

The object of this invention is to provide a generally improved apparatus of the said kind.

Referring to the drawings:—

Figure 1 is a perspective view of one form of apparatus constructed in accordance with this invention.

Figure 2 is a section on line 2—2 of Figure 1.

Figure 3 is a front elevation of same with the casing in section.

Figure 6 is a detail plan view partly in section showing the construction of the carrier.

Figure 7 is an inverted plan view of part of the carrier.

Figure 8 is a detail of the coin selecting mechanism.

Figure 9 is a further detail view of the hand control mechanism.

Figure 10 is a fragmentary perspective view of a slight modification.

Figure 11 is a sectional end elevation corresponding with Figure 2, but showing a modified construction.

Figure 12 is a plan view, partly in section, of the rotatable carrier illustrated in Figure 11.

Figure 13 is an inverted plan view of same.

Figure 4:
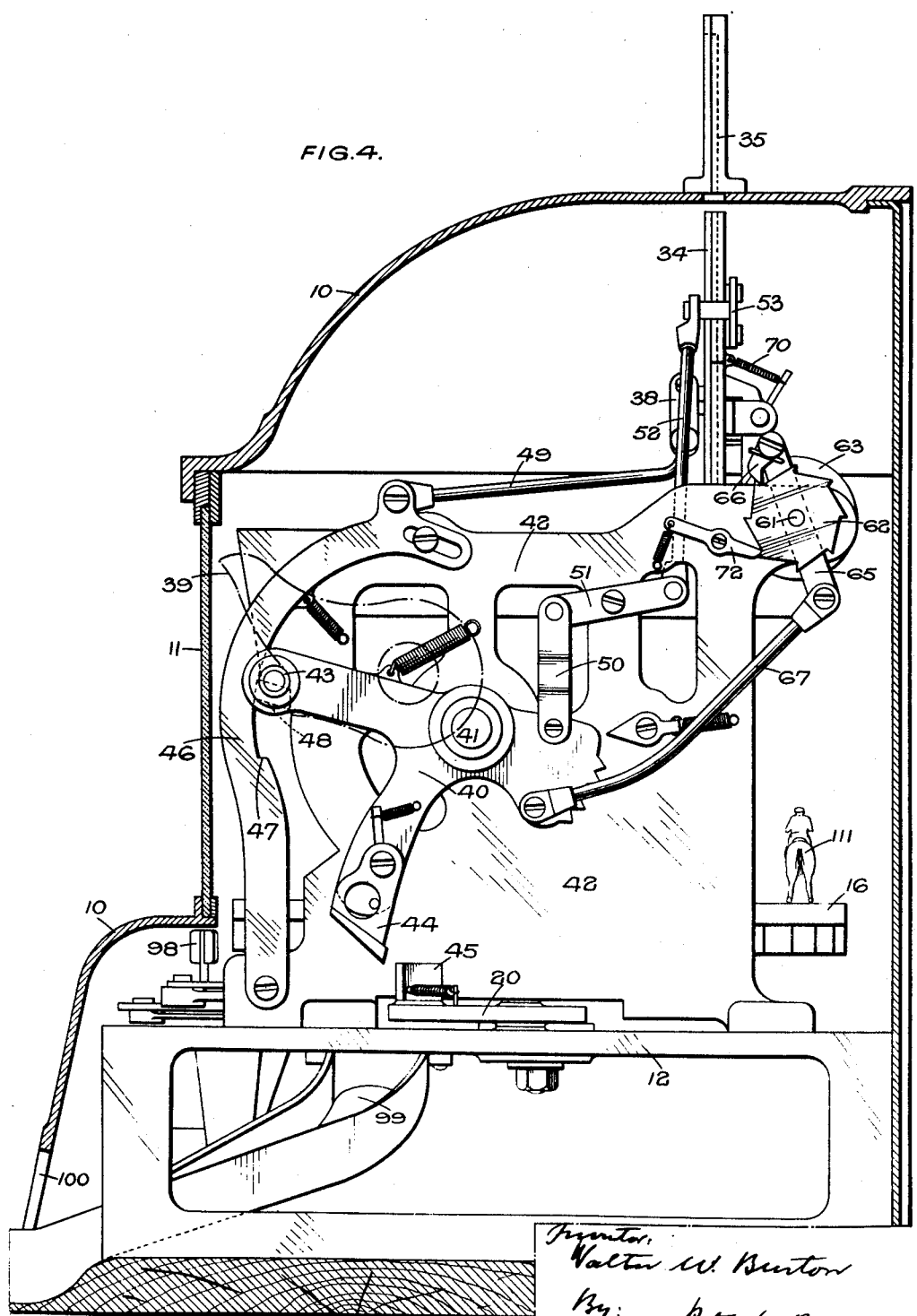
Figure 4 is an end elevation with the casing cut away to show the operating mechanism.

In the embodiment of this invention illustrated in Figures 1 to 8 of the accompanying drawings, the apparatus comprises an outer casing 10 of the general form illustrated in perspective in Figure 1 and having a glazed front 11 through which the operation of the apparatus can be observed.

Secured on the base 12 of the casing is a vertical spindle 13 upon which is mounted, so as to be freely rotatable thereon, a carrier 14 comprising two horizontal circular end plates 15 and 16 disposed one above the other and connected in spaced relationship.

To the lower part of this carrier is secured a ratchet wheel 17, and means are provided for giving this wheel a definite rotation in one direction so that the carrier can rotate when the apparatus is set in motion. The carrier is supported on a lower bearing 18 and an upper ball bearing 19 so that it can rotate freely when set in motion and will rotate for a certain time under its own inertia until this motion is checked by apparatus hereinafter to be described.

The means for operating the wheel 17 comprises a bar 20 pivoted at 21 to the base of the casing and provided with a spring pressed pawl 22 for engaging with the toothed wheel, this bar being moved in one direction by means of a spring 23. The arrangement is that when the bar 20 is operated from an actuating lever hereinafter to be described, the pawl 22 rides over the teeth of the ratchet wheel 17 and when the lever is released the pawl engages with one of these teeth and the spring 23 in returning the bar 20 to its normal position rotates the wheel 17 and the carrier to which this wheel is secured.

A spring pressed catch 24 is secured to the base to prevent movement of the carrier whilst the bar 20 is being moved by the actuating lever, so that the wheel 17 is only rotated when the bar 20 is moved by the spring 23. When set in motion by the spring 23 the carrier is free to rotate under its own inertia and continued movement of the carrier after the bar 20 is returned to its normal position by the spring 23 is enabled by the pawls 22 and 24 riding over the teeth of the wheel 17.

On the rotatable carrier are mounted a number of containers 25 of cylindrical form, disposed in a circle co-axial with the axis of the carrier and equally spaced apart, each of these containers communicating with the underside of the lower plate 16 and at its upper end with a coin receiving chamber 26 in the upper plate of the carrier. Each of the containers communicates with the chamber 26 through an opening 27, and is provided with a series of holes or slots 28 arranged one above the other so that the contents of any container, visible through the sight window 11 of the casing, can be seen by an observer or operator.

Each container 25 communicates with an opening 29 in the lower plate 16, and this opening is normally closed by a sliding plate or drawer 30 spring pressed by a spring 31 into the closing position as shown on the right hand side of Figure 2, but provided with an opening 32 which can be aligned with the opening 29 to allow discharge of the contents of the container as shown on the left hand side of Figure 2.

The apparatus is provided at one side with an actuating lever 33 which can be manipulated by a person placing a coin or counter in the apparatus, this lever being however, normally locked until the apparatus is freed so that the parts cannot be set in movement or operation until a coin or counter has been inserted.

A chute 34 is provided in the casing communicating with a hollow projection 35 at the upper part of the casing, this projection having an opening 36 through which the coins or counters are inserted.

When used hereinafter the term coin is intended to include counters and the like, by which is meant articles other than actual currency or having a direct currency rating.

A coin passed through the opening 36 moves down the chute 34 to the dotted position shown in Figure 3, the coin being retained in this position by means of a projection 37 on a pivoted lever 38, which lever normally occupies the position shown in Figure 3, with the projection 37 disposed in the passage for the coin. The actuating lever 33 is secured to the outer end of a spindle mounted for rotation in a suitable bearing provided in the casing, and on the inner end of this spindle is provided a cam 39 adapted to operate the mechanism for setting in motion the carrier and the remaining parts of the apparatus.

The cam 39 is adapted to operate a three armed lever 40 pivoted at 41 to a vertically disposed wall 42 within the casing, the cam 39 acting on a roller 43 secured to one arm of the lever 40. A further arm of the lever 40 is provided with a pivoted pawl or catch piece 44 adapted to engage a further pivoted foot or piece 45 secured to the bar 20, so that when the lever 40 is moved about its pivot by the actuating lever 33 the bar 20 is moved to enable rotation of the carrier.

In order to prevent actuation of the apparatus until a coin has been inserted, a stop arm 46 is pivoted to the wall 42, this stop arm having a notch 47 normally retained in the path of movement of a block or projection 48 provided on the lever 40 at the opposite side to that on which is disposed the roller 43. Thus when the actuating lever is moved, and unless the arm 46 is moved out of the position shown in Figure 4, the projection 48 engages the notch 47 and prevents operation of the apparatus.

The arm 46 is, however, connected by means of a link 49 to the catch lever 38, and when a coin is inserted in the chute it passes to the position shown in Figure 3, engaging the projection 37 on the lever 38. The three armed lever 40 is connected by means of a link 50 to a pivoted lever 51, to the opposite end of which is connected, by means of a link 52, a pivoted arm 53 having a projection 54 loosely mounted both in a curved slot 56 in the coin chute, and in a slot 55 in the lever, so that this projection 54 can move down the slot 55 and at the same time along the slot 56.

With a coin in the position shown in Figure 3 and on operation of the actuating lever 33, the lever 53 is moved, through the link and lever connections from the lever 40, and when this projection 54 moves sufficiently down the slot 55 to engage the edge of the coin, the catch lever 38 is moved about its pivot as the projection 37 is forced out of the coin slot and through the medium of the link 49, the catch arm 46 is moved out of the path of the projection 48. The three armed lever 40 is then free to continue its movement to operate the carrier through the bar 20.

The coin slot beyond the position of the projection 37 is forked into two branches 57 and 58 and selector means are provided whereby the percentage of coins passing down each of these arms is regulated.

The branch 57 conducts some of the coins into the coin chamber 26 for redistribution to an operator, these coins passing into one or other of the coin containers 25, whilst the arm 58 directs the remaining coins into a coin chamber at the base of the casing through vertically disposed guides 59 and 60 secured in the casing.

In the construction illustrated the arrangement is such that seven coins out of every eight passing into the apparatus are returned to the chamber 26 for redistribution, whilst one coin passes to the base of the casing and is thereafter solely under the control of the proprietor of the apparatus.

In order to effect this division of the coins, a selector mechanism is provided adjacent the junction of the arms 57 and 58, this mechanism comprising a spindle 61 upon one end of which is secured a ratchet wheel 62 having eight faces or teeth, a disc 63 being secured on the other end, this disc having a projecting pin 64.

An arm 65 is mounted for rotation around the shaft and at one end of the arm is provided a spring pressed pawl 66 adapted for cooperation with the teeth on the wheel 62, the other end being connected to the lever 40 through a link 67. The arrangement is such that when the lever 40 is moved by the actuating lever 33 the ratchet wheel is moved through one-eighth of a revolution and the pin 64 on the end of the disc 63 is moved a similar amount.

A catch lever 68 is pivoted to the coin chute adjacent the junction of the branches 57 and 58, this lever having two projections which can be moved into the path of the coins alternately, one projection 69 normally extending across the coin passage to prevent any coins passing into the branch 58, the projection being urged into this position by means of a spring 70.

Every eighth coin, however, is directed into the branch 58 by engagement between the pin 64 and the end of the lever 68 so that after every seven successive movements of the ratchet wheel 62, the pin 64 engages the lever and moves the projection 69 out of the coin passage, a further projection 71 being moved into the coin passage at a position clearly shown in Figure 3. This projection 71 prevents the eighth coin passing into the branch 57, and this coin then passes on to the branch 58 which is no longer obstructed by the projection 69.

By this means one coin out of 8 is directed into the container at the base of the casing, these coins being moved periodically by the proprietor.

A pivoted catch 72 is provided for cooperation with the ratchet wheel 62 to prevent movement in the reverse direction to that in which it is moved by the pawl 66.

As described above, insertion of a coin into the chute frees the three armed lever 40 and enables operation of this lever from the actuating lever 33, and movement of this lever 40 causes the portion 44 to engage the projection 45 on the bar 20, the pawl 22 moving over the ratchet wheel 17 as the spring 23 is expanded into the position for operating the rotational movement of the carrier.

The discharge of the coins from one of the chambers 25 is effected by means of a bell crank lever 73 under the action of the spring 74, and this lever is moved into the position ready for operating one of the slides if the carrier comes to rest with a slide opposite to the position of the end of this lever. A pivoted lever 75 is connected to the bar 20 by means of a link 76 so that movement of the bar by the actuating lever 33 moves this lever 75 about its pivot, from the normal position shown in Figure 5 engaging the stop 77, this movement also turning the bell crank lever 73 about its pivot and against the action of the spring 74.

The movement of the lever 75 also operates a further bell crank lever 78 pivoted at 79 to the base 12, one arm of the crank being disposed in the path of movement of a portion of increased thickness at one end of the lever 75, and the other arm being connected by means of a link 80 to a three armed lever 81. The connection between the crank 78 and the link 80 is a pin and slot connection, enabling a certain amount of lost motion, so that the bell crank 73 is moved into the desired position before the lever 81 is moved. When the pin on the crank 78 engages the end of the slot in the link 80, the crank 81 is moved about its pivot 82, and a rod 83 connected to this crank is moved through a bearing 84 across the path of the crank 73 to retain the latter out of engagement with the carrier or the slides carried thereby.

A further arm 85 of the crank 81 is provided with a projecting pin 86 which is adapted to release the pivoted catch 87 from engagement with the toothed edge 88 of the disc 16 so that the carrier is released ready for rotation by the spring 23 moving the bar 20 back to its normal position.

When the projection 86 engages the edge of an enlarged hole 89 in the arm 87 the nose 90 is moved out of engagement with the teeth on the peripheral edge of the disc 16, and a spring pressed catch 91 engages with a fixed stop 92 provided on the base so that the arm 87 is retained in the out-of-use position against the action of a returning spring 93.

A further arm 94 of the lever 81 is connected to a switch arm 95 having a contact 96 adapted to bridge a pair of stationary contacts 97 to connect an illuminating lamp 136 in circuit with a suitable battery located in the base of the casing, so that when the apparatus is set in motion the interior of the casing is illuminated and the operation of the carrier can be observed through the window 11.

The operation of the above mentioned parts is simultaneous with the depression or operation of the actuating lever 33, but the return movement is retarded suitably by means of a wind vane 98 connected by means of a suitable gear train to the spindle 82 on which the crank 81 pivots. A free wheel device is incorporated in the gear train so that the crank 81 can be moved readily and rapidly to set the apparatus in operation, but the parts cannot be returned to their normal positions rapidly since the movements are retarded by a wind vane 98.

After the insertion of a coin and operation of the lever 40 by the actuating handle 33, the coin passes to one or other of the branches 57 or 58 depending on the positions of the stops 69 and 71, and if the coin passes into the chamber 26 it is directed to one or other of the containers 25. The apparatus is freed by the passage of the coin, and the bar 20 can be moved about its pivot thus operating in succession the crank 73, the retaining spindle 83 for that crank, the stop arm 87 and the retaining catch 91 for that stop arm and the switch 96 for the illuminating lamp. When the nose 90 is cleared from the toothed periphery of the disc 16, and when the spring pressed piece 44 moves beyond the projection 45, the bar 20 is moved by the spring 23 and the carrier is rotated upon the spindle 13 by the cooperation of the pawl 22 and the ratchet wheel 17.

Figure 5:
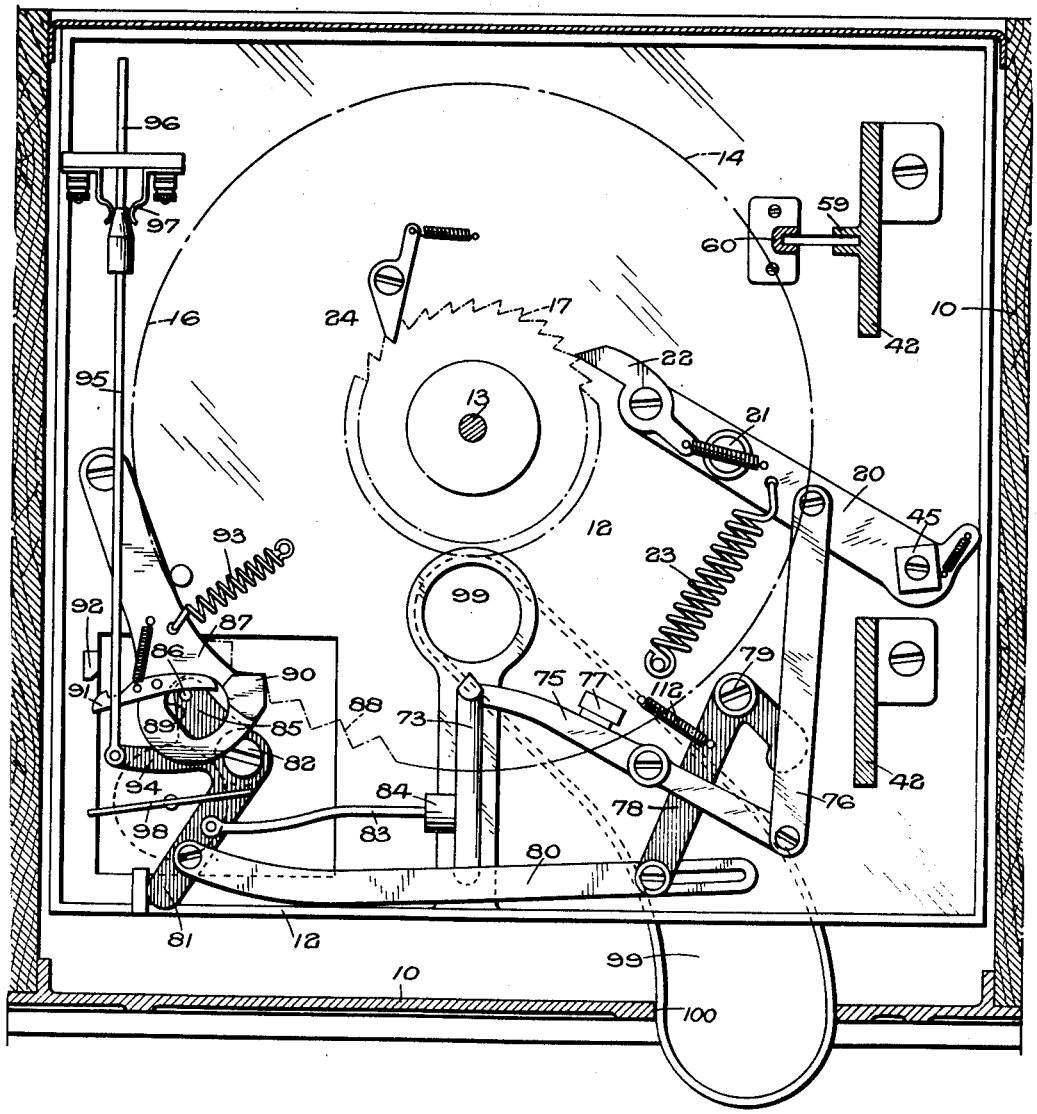
Figure 5 is a plan view with the casing in section and the rotatable carrier removed.

The bar 20 and the lever 75 return to their normal positions shown in Figure 5 and the carrier continues to rotate under its own inertia, whilst the crank 81 is being returned to its normal position under the action of a coiled spring 112 controlling the lever 78, movement of the crank being retarded by the wind vane 98. When the crank 81 is moved a sufficient distance for the projection 86 to engage the tail of the catch 91 and release the latter from the stop 92, the stop arm 87 is moved by the spring 93 into engagement with one of the teeth in the periphery of the disc 16 bringing the carrier to rest.

In addition the spindle 83 has been moved out of the path of the crank 73 which finally moves under the action of the spring 74 towards the edge of the disc 16, and if the carrier has come to rest with none of the slides 30 exactly opposite to the end of the crank this latter engages the toothed edge of the disc 16 and no coins are discharged.

If, however, the carrier has stopped with one of the slides opposite the end of the crank 73, then the slide is forced inwardly by the spring 74 against the action of the spring 31 and any coins, in the container 25 disposed above that slide, pass through the apertures 29 and 32 to the discharge chute 99 leading to the exterior of the casing from which they can be removed through the outlet 100. At this point the parts have been returned to their original positions and the apparatus is ready for further operation when a further coin is inserted into the chute.

In order to prevent jamming in the event of coins being directed from the chamber 26 into one of the containers 25 which is already full of coins, further containers are provided within the circle of containers 25 as shown at 101, and these containers 101 communicate with the containers 25 through slots 102.

A pin 103 is provided at the upper end of each container 25 so that when any container is full of coins, as shown on the left hand side of Figure 2, a further coin directed into this container engages the projection 103 as is shown at 104 in Figure 2, and this coin then operates as a chute to direct any further coins into the container 101 associated with that particular container 25.

The upper ends of the containers 101 are normally covered by a cowl or cover 105 to prevent coins passing into these containers unless the corresponding container 25 is full of coins, and this portion of the apparatus is only provided to prevent jamming of the apparatus such as might occur if coins were piled above one or other of the containers 25.

In order to enable control of the apparatus by an operator, a control knob 106 is provided on the outside of the casing, this knob being mounted on a sliding spindle 107, the inner end of which engages one end of a pivoted lever 108 provided at its other end with a block 109 for engagement with the peripheral edge of the disc 16. Operation of the knob 106 releases the lever 108 which is moved by the spring 110 until the block 109 engages the edge of the disc to bring the carrier to rest. This device must, however, be operated prior to the operation of the stop arm 87 which also acts on the disc 16, and if the hand control 106 is not operated, the mechanism operates automatically to bring the carrier to rest.

By operating the knob 106, however, it is possible to stop the carrier at any desired position so that one or other of the containers 25 can be discharged of its contents by the operation of the bell crank 73 and the closing slides 30.

The rotatable carrier preferably is constructed so as to resemble as nearly as possible a "Roundabout" and to this end miniature horses, as shown at 111 are mounted on the upper surface of the disc 16, one opposite each of the coin containers 25, these horses being differentially coloured.

Alternatively motor cars or other devices may be substituted for the horses.

In Figure 10 is illustrated a fragmentary view of a modified form of the lower disc 16 for the rotatable carrier, the disc having, in place of the toothed edge 88 as in the construction above described, a smooth peripheral edge 137 provided with slots 113 through which the end 114 of the slide operating lever acts upon one of the sliding plates 30 to discharge the coins from one of the chutes. The disc is provided at each side of each slot 113 with two small recesses 115, and the end 114 of the lever is formed of V shape so that if one or other of the points of this end engage in one of the recesses 115 the lever is prevented from entering the slot to move the sliding plate or drawer 30, and it is impossible to rotate the disc slightly by tilting the casing to bring the end of the lever and the slot 113 into alignment.

In a modification illustrated in Figures 11 to 13 the operating and controlling mechanism is similar to that described with reference to Figures 1 to 9, but the rotatable carrier is of slightly different construction although the operation is not substantially affected.

The carrier comprises upper and lower circular end plates 116 and 117 connected together in spaced relationship, and mounted upon a vertical spindle 118 by means of upper and lower bearings 119 and 120, a ratchet wheel 121 being secured to the lower plate 117 to enable rotation of the carrier as described with reference to the construction illustrated in Figures 1 to 9.

The carrier is provided with coin containers 122 arranged in a circle and in suitable spaced relationship, and in this construction the containers are constructed from glass or transparent material so that the coins contained therein can readily be observed.

The discharge of the coins from any container is controlled by mechanism substantially as described with reference to Figures 1 to 9, this including a lever 73 adapted to cooperate with sliding plates 30 provided beneath the plate 117 and one for each of the containers 122.

In this construction however, a further rotatable member is provided between the discharge lever 73 and the ends of the sliding plates 30, this comprising a ring 123 mounted by means of a spider 124 on a further ball bearing 125, so that the ring 123 can rotate around and with respect to the carrier.

A further ratchet wheel 126 is secured to the spider 124, and in operation the apparatus described for setting in motion the carrier, in the construction illustrated in Figures 1 to 9, is adapted to engage with both ratchet wheels 121 and 126 so that the carrier and the ring 123 are rotated when the apparatus is set in motion, in a manner similar to that described with reference to the first mentioned construction.

When set in motion the carrier and the ring 123 rotate at different speeds, owing to the difference in momentum and inertia, and the ring can rotate with respect to the carrier, the horses 127 moving with the ring 123 around the carrier.

When the apparatus is brought to rest the lever 73 can only operate one of the sliding plates 30 if one of the slots 128 in the ring 123 is aligned with the end of one of the plates 30, and both of these are opposite the end of the lever 73. If a slot 128 is opposite the end of the lever, but none of the sliding plates 30 is in line therewith, there is no discharge of coins from the apparatus, and further, if one of the slots 128 is not in line with the end of the lever 73, coins cannot be discharged even if one of the sliding plates is in a position opposite the end of the lever.

In order to bring the carrier and the ring 123 to rest simultaneously, a toothed ring 129 is secured to the ring 123 by the bolts used for fixing the horses, and a further ring 130 is secured to the upper plate 116, the pivoted catch 87, as in the construction described above, cooperating with the teeth on the ring 129, whilst an extension 135 on this catch 87 projects vertically at the side of the carrier and is provided with a nose adapted to cooperate with the teeth on the ring 130.

Thus although the ring 123 and the carrier rotate relative to one another once they are set in motion, they are both brought to rest together when the pivoted catch 87 is moved into the stopping position.

The teeth on the rings 129 and 130 are made of unequal size in order that the chances of emptying the coin containers are made unequal, and with this arrangement some of the coin containers can be emptied relatively easily, whilst other containers are not easily emptied and thus become charged with coins, to a greater extent increasing the attractiveness of the apparatus.

For example, one or more of the teeth are provided with a relatively long inclined side 131 so that the arc of the circle over which the nose of the pivoted catch 87 can engage between this tooth and the adjacent tooth 132, is substantially greater than in the case of teeth of equal size as shown at 133, and substantially greater than in the case of small teeth as shown at 134.

The possibility of the nose 87 engaging between the necessary teeth of the size shown at 134, is considerably less than with teeth such as 131 and 132, so that some of the coin containers are relatively inaccessible by the discharge mechanism and the frequency with which any of the coin containers is emptied can be varied as desired.

The various forms of teeth on the rings 129 and 130 are illustrated in Figures 12 and 13, and by this means the operation of the apparatus can be improved, giving an added attraction to operators.

If desired the teeth on the disc 16, in the construction illustrated in Figures 1 to 9, may be of the form illustrated in Figures 12 and 13, so that the frequency of discharge of the coins from the various coin containers 25 can be varied as described with reference to Figures 11 to 13.

What I claim then is:—

1. An amusement device including a casing, an actuating lever operable from the exterior of said casing, mechanism for rendering operative said lever on insertion of a counter in the apparatus, a rotatable carrier, means operable by said actuating lever for rotating said carrier, a number of containers on said carrier, selecting mechanism controlling the percentage of the said inserted counters that are passed to said containers for redistribution, discharge controlling means for each of said containers adapted to move therewith and for regulating discharge of counters therefrom, release means associated with a stationary part of the apparatus, for causing the release of counters by any one of said discharge controlling means which may register with such release means when the rotatable carrier comes to rest, and stop means manually controllable by an operator for bringing said carrier to rest.

2. An amusement device including a casing, an actuating lever operable from the exterior of said casing, mechanism for rendering operative said lever on insertion of a counter in the apparatus, a rotatable carrier, means operable by said actuating lever for rotating said carrier, a number of containers on said carrier, each of said containers having a discharge opening in the base thereof, selecting mechanism controlling the percentage of said inserted counters passed to said containers for redistribution, discharge controlling means for each of said containers adapted to move therewith and for regulating discharge of counters therefrom, and said means including a discharge slide normally closing the discharge opening in said container, said slide having a discharge opening capable of being aligned with the discharge opening in said container, release means associated with a stationary part of the apparatus, for causing the release of counters by any one of said discharge slides which may register with such release means when the rotatable carrier comes to rest, a discharge chute communicating with the exterior of the casing and into which chute are delivered counters discharged by one of said slides, and stop means manually controllable by an operator for bringing the carrier to rest.

3. An amusement device including a casing, an actuating lever operable from the exterior of said casing, mechanism for rendering operative said lever on insertion of a counter in the apparatus, a rotatable carrier, means operable by said actuating lever for rotating said carrier, a number of containers on said carrier, each of said containers having a discharge opening in the base thereof, selecting mechanism controlling the percentage of said inserted counters passed to said containers for redistribution, discharge controlling means for each of said containers adapted to move therewith and for regulating discharge of counters therefrom, and said means including a discharge slide normally closing the discharge opening in said container, said slide having a discharge opening capable of being aligned with the discharge opening in said container, release means associated with a stationary part of the apparatus, said means including a release lever operating any one of said discharge slides which may register with such release means when the rotatable carrier comes to rest, a discharge chute communicating with the exterior of the casing and into which chute are delivered counters discharged by one of said slides, and stop means manually controllable by an operator for bringing the carrier to rest.

4. A coin freed amusement device including a casing, an actuating lever operable from the exterior of said casing, coin freed mechanism for rendering operative said lever on insertion of a coin in the apparatus, a rotatable carrier operable by means of said actuating lever, a ratchet wheel on said carrier, a pivoted bar moved by said actuating lever, a pawl on said bar cooperating with said ratchet wheel, said pawl moving idly round said ratchet wheel when said bar is moved by said actuating lever, a spring for said bar, said spring returning said bar when released from said actuating lever and rotating said carrier through the pawl and ratchet wheel, a number of coin containers on said carrier, each of said containers having a coin discharge opening in the base thereof, coin selecting mechanism controlling the percentage of the said inserted coins passed to said coin containers for redistribution, coin discharge controlling means for each of said containers adapted to move therewith and for regulating discharge of coins therefrom, and said means including a coin discharge slide normally closing the discharge opening in said container, said slide having a discharge opening capable of being aligned with the discharge opening in said container, coin release means associated with a stationary part of the apparatus, for causing the release of coins by any one of said coin discharge slides, which may register with such coin release means when the rotatable carrier comes to rest, a discharge chute communicating with the exterior of the casing and into which chute are delivered coins discharged by one of said slides, and stop means manually controllable by an operator for bringing the carrier to rest.

5. A coin freed amusement device including a casing, an actuating lever operable from the exterior of said casing, coin freed mechanism for rendering operative said lever on insertion of a coin in the apparatus, a rotatable carrier, means operable by said actuating lever for rotating said carrier, a number of coin containers on said carrier, each of said containers having a coin discharge opening in the base thereof, coin selecting mechanism controlling the percentage of the said inserted coins passed to said coin containers for redistribution, coin discharge controlling means for each of said containers adapted to move therewith and for regulating discharge of coins therefrom, said means including a coin discharge slide normally closing the discharge opening in said container, said slide having a discharge opening capable of being aligned with the discharge opening in said container, coin release means associated with a stationary part of the apparatus, said means including a release lever which when freed operates any one of said coin discharge slides, which may register with such coin release means when the rotatable carrier comes to rest, means for retaining said release lever normally inoperative, stop means for bringing said carrier to rest, means for disengaging said stop means when the actuating lever is operated, slow motion mechanism freeing said release lever and allowing said stop means to re-engage but allowing a time lag in which the carrier can rotate freely, a discharge chute communicating with the exterior of the casing and into which chute are delivered coins discharged by one of said slides, and a further stop member controllable by an operator for bringing said carrier to rest.

6. A coin freed amusement device including a casing, an actuating lever operable from the exterior of said casing, coin freed mechanism for rendering operative said lever on insertion of a coin in the apparatus, a rotatable carrier, means operable by said actuating lever for rotating said carrier, a number of coin containers on said carrier, each of said containers having a coin discharge opening in the base thereof, coin selecting mechanism controlling the percentage of the said inserted coins passed to said coin containers for redistribution, coin discharge controlling means for each of said containers adapted to move therewith and for regulating discharge of coins therefrom, said means including a coin discharge slide normally closing the discharge opening in said container, said slide having a discharge opening capable of being aligned with the discharge opening in said container, coin release means associated with a stationary part of the apparatus, said means including a release lever operating any one of said coin discharge slides, which may register with such coin release means when the rotatable carrier comes to rest, stop means for bringing said carrier to rest, said stop means being operated automatically after a predetermined interval, further stop means manually operable by an operator of the device for bringing said carrier to rest, means for disengaging said stop means when the actuating lever is operated, and a discharge chute communicating with the exterior of the casing and into which chute are delivered coins discharged by one of said slides.

7. A coin freed amusement device including a casing, an actuating lever operable from the exterior of said casing, coin freed mechanism for rendering operative said lever on insertion of a coin in the apparatus, a rotatable carrier, means operable by said actuating lever for rotating said carrier, a number of coin containers on said carrier, each of said containers having a coin discharge opening in the base thereof, coin selecting mechanism controlling the percentage of the said inserted coins passed to said coin containers for redistribution, coin discharge controlling means for each of said containers adapted to move therewith and for regulating discharge of coins therefrom, said means including a coin discharge slide normally closing the discharge opening in said container, said slide having a discharge opening capable of being aligned with the discharge opening in said container, coin release means associated with a stationary part of the apparatus, said means including a release lever which when freed operates any one of said coin discharge slides, which may register with such coin release means when the rotatable carrier comes to rest, means for retaining said release lever normally inoperative, peripherally arranged teeth on said carrier, a stop lever cooperating with said teeth for bringing said carrier to rest, said teeth being of irregular size to vary the relative chances of the stop lever engaging therewith, means for disengaging said stop means when the actuating lever is operated, slow motion mechanism freeing said release lever and allowing said stop means to re-engage but allowing a time lag in which the carrier can rotate freely, and a discharge chute communicating with the exterior of the casing and into which chute are delivered coins discharged by one of said slides, and a further stop member controllable by an operator for bringing said carrier to rest.

8. A coin freed amusement device including a casing, an actuating lever operable from the exterior of said casing, coin freed mechanism for rendering operative said lever on insertion of a coin in the apparatus, a rotatable carrier, means operable by said actuating lever for rotating said carrier, a number of coin containers on said carrier, each of said containers having a coin discharge opening in the base thereof, coin selecting mechanism controlling the percentage of the said inserted coins passed to said coin containers for redistribution, coin discharge controlling means for each of said containers adapted to move therewith and for regulating discharge of coins therefrom, said means including a coin discharge slide normally closing the discharge opening in said container, said slide having a discharge opening capable of being aligned with the discharge opening in said container, coin release means associated with a stationary part of the apparatus, said means including a release lever, a ring rotatably mounted for movement around said carrier, said ring having slots which when aligned with said release lever allow the latter to operate any one of said coin discharge slides which may register with such coin release means when the rotatable carrier comes to rest, stop means for bringing said carrier to rest, means for retaining said release lever normally inoperative, means for disengaging said stop means when the actuating lever is operated, a discharge chute communicating with the exterior of the casing and into which chute are delivered coins discharged by one of said slides, and a further stop member controllable by an operator for bringing said carrier to rest.

9. A coin freed amusement device including a casing, an actuating lever operable from the exterior of said casing, coin freed mechanism for rendering operative said lever on insertion of a coin in the apparatus, a rotatable carrier, means operable by said actuating lever for rotating said carrier, a number of coin containers on said carrier, each of said containers having a coin discharge opening in the base thereof, coin selecting mechanism controlling the percentage of the said inserted coins passed to said coin containers for redistribution, coin discharge controlling means for each of said containers adapted to move therewith and for regulating discharge of coins therefrom, said means including a coin discharge slide normally closing the discharge opening in said container, said slide having a discharge opening capable of being aligned with the discharge opening in said container, coin release means associated with a stationary part of the apparatus, said means including a release lever, means for retaining said lever normally inoperative, a ring rotatably mounted for movement around said carrier, a ratchet wheel on said carrier, a ratchet wheel for said ring, a pivoted bar moved by said actuating lever, a pawl on said bar cooperating with said ratchet wheels, said pawl moving idly round said ratchet wheels when said bar is moved by said actuating lever, a spring for said bar, said spring returning said bar when released from said actuating lever and rotating said carrier and said ring through the pawl and ratchet wheels, said ring having slots which when aligned with said release lever allow the latter to operate any one of said coin discharge slides, which may register with such coin release means when the rotatable carrier comes to rest, stop means for bringing said carrier and said ring to rest, means for disengaging said stop means when the actuating lever is operated, slow motion mechanism freeing said release lever and allowing said stop means to re-engage but allowing a time lag in which the carrier can rotate freely, a discharge chute communicating with the exterior of the casing and into which chute are delivered coins discharged by one of said slides, and a further stop member controllable by an operator for bringing said carrier to rest.

10. A coin freed amusement device including a casing, an actuating lever operable from the exterior of said casing, coin freed mechanism for rendering operative said lever on insertion of a coin in the apparatus, a rotatable carrier, means operable by said actuating lever for rotating said carrier, stop means for bringing said carrier to rest, means for disengaging said stop means when the actuating lever is operated, a number of containers on said carrier, each of said containers having a discharge opening in the base thereof, a discharge slide for each container, said slide normally closing said discharge opening but having an opening capable of being aligned with said discharge opening, means for operating said discharge slide to align said openings and discharge the contents of said container, said means including a release lever, a spring for said lever, means acting to move said release lever against the action of said spring when the actuating lever is operated, said spring subsequently moving said release lever to operate one of said discharge slides when said carrier comes to rest, a discharge chute communicating with the exterior of said casing and into which chute are delivered the contents of said container, and a further stop member controllable by an operator for bringing said carrier to rest.

11. A coin freed amusement device including a casing, an actuating lever operable from the exterior of said casing, coin freed mechanism for rendering operative said lever on insertion of a coin in the apparatus, a rotatable carrier, means operable by said actuating lever for rotating said carrier, stop means for bringing said carrier to rest, means for disengaging said stop means when the actuating lever is operated, a number of containers on said carrier, each of said containers having a discharge opening in the base thereof, a discharge slide for each container, said slide normally closing said discharge opening, but having an opening capable of being aligned with said discharge opening, means for operating said discharge slide to align said openings and discharge the contents of said container, said means including a release lever, a spring for said lever, means acting to move said release lever against the action of said spring when the actuating lever is operated, slow motion mechanism allowing a time lag in which the carrier can rotate freely, said mechanism subsequently allowing said stop means to re-engage and freeing said release lever to operate one of said discharge slides, a discharge chute communicating with the exterior of said casing, and into which chute are delivered the contents of said container, and a further stop member controllable by an operator for bringing said carrier to rest.

WALTER WILLIAM BURTON.